(12) United States Patent
Martin

(10) Patent No.: US 8,896,425 B1
(45) Date of Patent: Nov. 25, 2014

(54) APPARATUS AND METHOD FOR SERIALIZED CONTINUOUS ENCODING OF RFID TAGS

(76) Inventor: Lawrence J Martin, Efland, NC (US)

( * ) Notice: Subject to any disclaimer, the term of this patent is extended or adjusted under 35 U.S.C. 154(b) by 113 days.

(21) Appl. No.: 13/573,045

(22) Filed: Aug. 16, 2012

Related U.S. Application Data (60) Provisional application No. 61/575,519, filed on Aug. 23, 2011.

(51) Int. Cl.
*H04Q 5/22* (2006.01)
*G06K 7/10* (2006.01)

(52) U.S. Cl.
CPC .................................. *G06K 7/10009* (2013.01)
USPC ...................................................... 340/10.51

(58) Field of Classification Search
CPC . G06K 7/0008; G06K 19/0723; G06K 17/00; G06K 7/10336; G07C 9/00111
USPC ............................................. 340/10.1, 10.51
See application file for complete search history.

(56) References Cited

U.S. PATENT DOCUMENTS

| | | | | |
|---|---|---|---|---|
| 6,079,619 | A * | 6/2000 | Teraura et al. | 235/380 |
| 7,114,654 | B2 | 10/2006 | Chapman | |
| 7,375,636 | B1 | 5/2008 | Martin | |
| 7,378,967 | B2 | 5/2008 | Sullivan | |
| 7,380,714 | B2 | 6/2008 | Jusas | |
| 7,506,803 | B2 | 3/2009 | Skaistis | |
| 2006/0007771 | A1 * | 1/2006 | Sato | 365/226 |
| 2007/0040681 | A1 * | 2/2007 | Jessup | 340/572.1 |
| 2008/0061946 | A1 * | 3/2008 | Suzuki | 340/10.51 |
| 2011/0305335 | A1 * | 12/2011 | Negishi et al. | 380/255 |

\* cited by examiner

*Primary Examiner* — Omer S Khan (57) ABSTRACT

A Method for rapidly encoding RFID Tags on a moving web, using well established encoding techniques supplemented by an elegant but unobvious mechanism for enforcing the order of data encoded to said RFID Tags.

2 Claims, 6 Drawing Sheets

APPARATUS AND METHOD FOR SERIALIZED CONTINUOUS ENCODING OF RFID TAGS

CROSS-REFERENCE TO RELATED APPLICATIONS

The application is based upon and claims the benefit of U.S. Pat. No. 7,375,636, Apparatus and method for real time functional testing of RFID Tags, granted May 20, 2008, to the present inventor; the entire contents of which are incorporated herein by reference.

The application further is based upon and claims the benefit of U.S. patent application Ser. No. 12/454,224, "Antenna Assemblies for Real Time Functional Testing of RFID Tags," filed 14 May 2009 by the present inventor, the entire contents of which are incorporated herein by reference.

The application further is based upon and claims the benefit of U.S. Provisional Patent Application 61/575,519, "Apparatus and Method for Serialized Continuous Encoding of RFID Tags," filed 23 Aug. 2011 by the present inventor; the entire contents of which are incorporated herein by reference.

FEDERALLY SPONSORED RESEARCH

Not Applicable

SEQUENCE LISTING OR PROGRAM

Not Applicable

BACKGROUND OF THE INVENTION

1. Field of Invention

This invention generally relates to the production of Radio Frequency Identification Device (RFID) tags, specifically to the economical encoding and verification testing of finished UHF, HF and other frequency RFID Tags in a production environment.

2. Prior Art

RFID Tag Encoding

RFID chips, the basis of inlays, labels and tags, are typically designed with a plurality of memory elements. Some of said memory elements are changeable and others are not. The process of Commissioning new RFID Tags often involves reading the unchangeable fields from each new tag; saving the data from said unchangeable fields in a database; computing data to be written into said changeable fields; and writing said data. Commissioning operations typically take place inside a special purpose device like a label printer that also encodes RFID Tags, often called a Printer-Encoder. Commissioning operations are sometimes performed by larger scale singulated encoding processes on large printing presses, like the LineLogix system marketed by the current Inventor.

Commissioning operations are similarly sometimes performed by Bulk or Continuous Encoding operations on large printing presses. The Impinj company is the leader in technology that enables Bulk and Continuous encoding, specifically to UHF tags of Electronic Product Code (EPC) Class1 Generation 2 (Gen2). Their technology allows rapid encoding of large numbers of Tags; however, it has certain shortcomings that limit its usefulness. Overcoming those shortcomings is one subject of the current Invention. Extending the benefits of continuous encoding to RFID protocols that do not include such a mechanism, but which allow selection by Unique Identifier (UID), is another subject of the current Invention. Examples of such protocols are ISO15693 and ISO14443 High Frequency (HF) RFID Tags.

The shortcomings of the most common Continuous and Bulk Encoding technologies, which are overcome by the current Invention, include:

1. Lack of Ordering—because Continuous and Bulk Encoding operate on a plurality of tags, they cannot discern the order of said tags in their underlying medium, for example a moving paper web of tags or a conveyor bearing tagged items.
2. Incomplete Failure Data—Continuous and Bulk Encoding processes can report if a certain tag failed to complete an encoding process; however, those processes have no way to know whether any tags have escaped the process completely. For example, if a label or product bear a label with no RFID Tag, or if a good tag passes outside the effective range of the encoding mechanism, or if some weak tags slow the encoding mechanism such that good tags escape notice due to timing effects, the Continuous and Bulk Encoding mechanism will never report a failure.
3. Nondeterministic Failure Data—Continuous and Bulk Encoding processes may well report a failed encoding operation, or report a count of successful operations that disagrees with an external count of items moving through said process. But Continuous and Bulk Encoding processes will never be able to identify which of said items failed the Continuous and Bulk Encoding process. That fact requires any batch of such items to be separately tested, wasting time and resources. It will be shown that the present invention improves current Continuous and Bulk Encoding processes in all the above respects.
4. Specificity to Frequency Range and Protocol—The process of Continuous and Bulk encoding is part of the protocol definition of the EPC Class 1 Generation 2 RFID Tag for UHF. The techniques disclosed here allow the encoding of any RFID Tag in continuous motion, as long as the reader and protocol support selection by a Unique Identifier (UID).

RFID Integrated Circuit Advances

Ultra High Frequency (UHF) RFID Tags of Electronic Product Code (EPC) Class1 Generation 2 contain a memory bank known as the Tag Identifier (TID). In the original devices of this class, the TID was simply a short field bearing a manufacturer's code. Starting around 2010, devices of this class began to implement an optional extension to the TID—an unchangeable field bearing a large serialized number, typically 64 bits long. The value of each serialized TID on each RFID Tag so equipped is meant to be globally unique.

Much has been written on the usage of the TID for security purposes. The current invention uses the TID in an elegant yet unobvious manner to improve common Continuous and Bulk Encoding processes by providing data related to the order of items entering said processes.

The current invention further uses the Unique Identifier (UID) of some RFID Tags to support encoding of those tags in continuous motion. High Frequency (HF) RFID Tags do not have a Bulk or Continuous Encoding capability, but do support selection by UID. It is possible to extend the benefits of this Invention to tags in the HF and other frequency ranges by using multiple individual encoders, each programmed to look for a particular UID, and to encode unique corresponding data to said RFID Tag. In obvious implementations, the long time needed to encode RFID Tags far overshadows the short time needed to read them. An obvious process for continuous encoding of HF Tags would have to run slowly enough that each tag was coupled to the encoding antenna for the worst case encoding time; however, that is not practical because it would slow the continuous process to an uneconomical degree. Further, an obvious process would have to restrict the size of the encoding antennas so that one and only one Tag was coupled to each antenna at any time, further driving the speed of the process down to uneconomical levels. The current Invention discloses an elegant but unobvious mechanism for overcoming these described limitations and encoding HF RFID Tags, indeed any RFID Tag that supports selection by UID, in a continuous process at economic speeds.

3. Objects and Advantages

Accordingly, several objects and advantages of this Apparatus and Method for Serialized Continuous Encoding of RFID Tags are the encoding of RFID Tags in continuous motion at the best speeds attainable by common Continuous, Bulk and Selected Encoding processes while further:

(a) Determining the order of items entering the process
(b) Detecting failures via a plurality of mechanisms
(c) Isolating or marking failures without a separate test process
(d) Reporting on the sequence of items in a batch of said items, including the position of each specific item in the batch, and its success or failure in the Encoding process.

Further objects and advantages will become apparent from a consideration of the ensuing description and drawings.

SUMMARY

This Apparatus and Method for Serialized Continuous Encoding of RFID Tags allows use of common and well known Continuous, Bulk and Singulated Encoding processes for RFID Tags in environments where the ordering of physical items is important and in which it is important to identify failures.

DRAWINGS

Figures

DRAWINGS

Reference Numerals

1 Continuous Web of RFID Tags
2 Singulated RFID Reader
3 Continuous Encoding Antenna
4 Continuous Encoding RFID Reader
5 Software Program
6 Report of RFID TID or UID Sequence and Bad Tags
7 Optical Sensor
8 Plurality of Tagged Items
9 Marking or Rejection Mechanism
10 Read Optical Sensor
11 Read RFID TID or UID
12 Record RFID TID or UID or Error in Report
13 For Each RFID TID or UID in the Report
14 Compute or Look Up Specific Data
15 Send Data to Continuous Encoding RFID Reader
16 Enqueue Data for Singulated Verification
17 Singulated RFID Encoders

DETAILED DESCRIPTION

Figure 1:
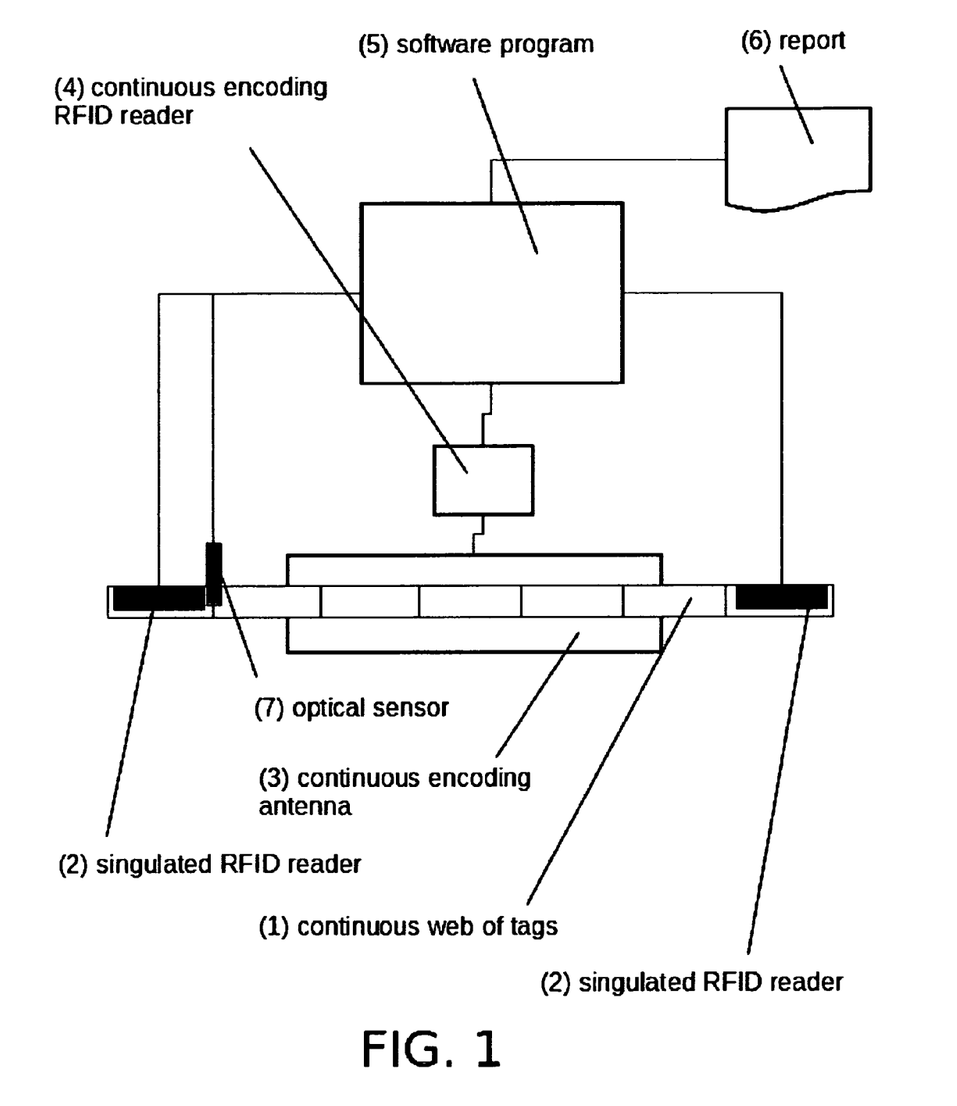
FIG. 1 is the preferred embodiment, with a single row of RFID Tags.
Figure 5:
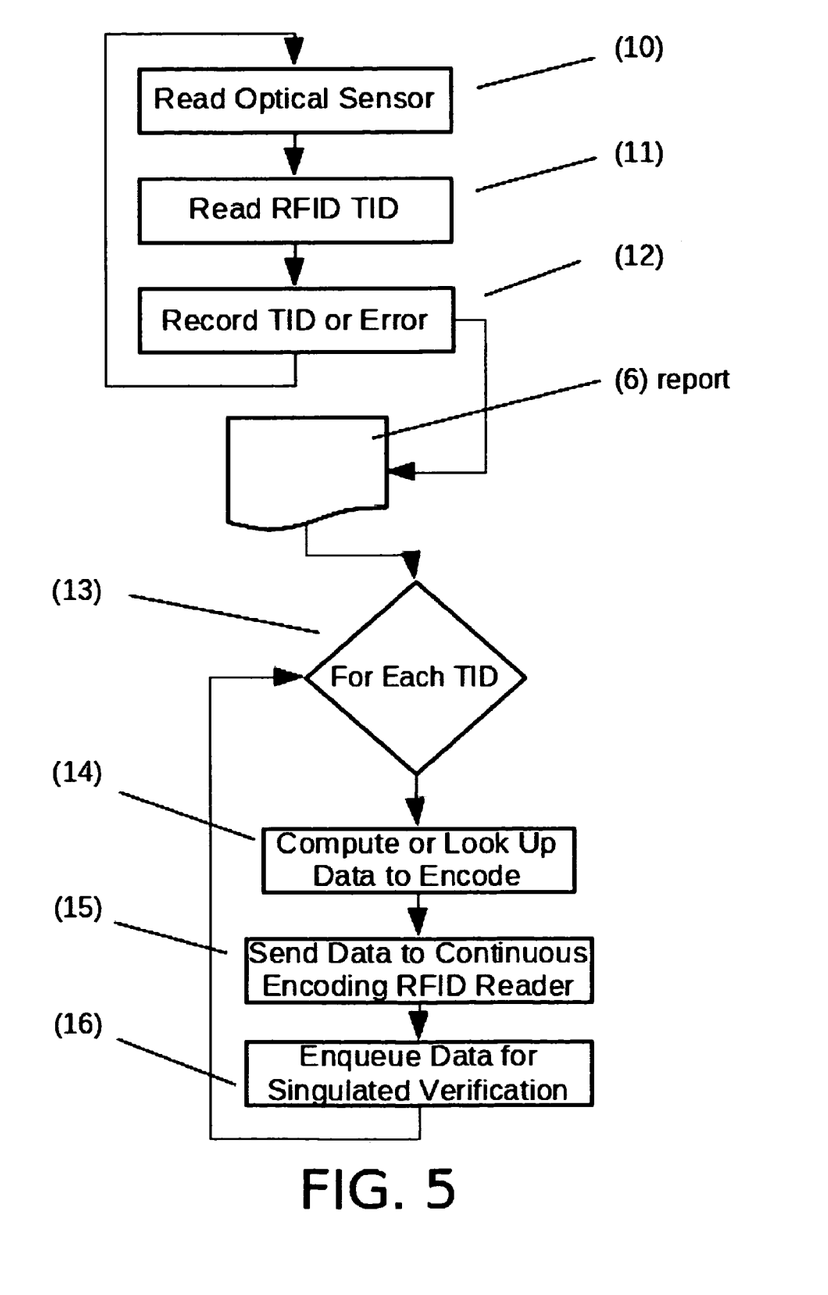
FIG. 5 is a partial flowchart of the software program.

FIGS. 1 and 5

Preferred Embodiment

In FIG. 1, a continuous web of RFID Tags (1) is operated on by a Software Program (5) through a plurality of sensors and actuators. In this and all Figures showing physical Apparatus, motion proceeds from left to right.

Said Software Program (5) may execute on Personal Computer (PC), Programmable Logic Controller (PLC) or any other computing device as previously disclosed by the current inventor and elsewhere. The key to the current invention is in the processing performed by (5), implemented in any specific embodiment.

In (10), said Software Program (5) waits for an operational trigger. Said trigger is shown here to originate in an Optical Sensor (7), but may originate with any number of common sensors; it may also originate with a Programmable Logic Controller (PLC) or other external computing element.

In (11), (5) reacts to the trigger received in (10) by reading one RFID Tag of (1) through a Singulated RFID Reader (2). Said (2) is able, through a variety of mechanisms previously disclosed by the current inventor, to read one and only one RFID Tag, when commanded to do so, that being the definition of Singulated operations in RFID. Assuming said RFID Tags are of the type EPC Class 1 Generation 2, (2) will capture its TID. RFID Tags of other types may be processed in this manner by reading similarly unique or invariant data fields, for example the Unique Identifier (UID) of common High Frequency (HF) RFID Tags conforming to ISO15693 or ISO14443.

In (12), (5) saves the data captured in (11) to a Report (6). Said Report may be simply a data structure in local storage. It may be a signal or text file, or it may be a database operation that saves the TID or UID. In each case, the key to the role of (6) in this invention is that a plurality of TID/UID values, and records of failed attempts, are saved electronically along with their sequences. Timestamping or other serialization may be used to preserve the sequence of TID values and failure events.

In (13), (5) reads said Report (6) and serially operates on each TID/UID value and failure event therein. As stated above, (6) may be embodied in something as simple as a memory array or as complex as a database.

In (14), (5) establishes the correct data to be encoded to the RFID Tag from which said TID/UID was read, when operating on any TID/UID data entry. When operating on any failure event, (5) enqueues a failure action. Said action may be an entry in a further Report, or an action through an actuator, not shown in FIG. 1.

In (15), (5) sends data to a Continuous Encoding RFID Reader (3). The specific format of this data will vary by implementation. One current example is the Access Specifier of a Low Level Reader Protocol (LLRP) program, which sets up a compliant RFID reader to wait for a tag with the specified TID and write the given EPC thereto; however, other equivalent implementations in other command protocols will be considered as part of this Invention as long as the RFID reader accepts a plurality of such instructions for execution when opportunity occurs. In each case, said Continuous Encoding RFID Reader (3) will be capable of accepting a command that pairs data already present on RFID Tags with data to be encoded to RFID Tags. Said Reader (3) will search for RFID Tags. Said Reader (3) will search for RFID Tags through a Continuous Encoding RFID Antenna (4), which will produce a Radio Frequency (RF) field that is physically large in relation to said RFID Tags. Said Antenna (4) will therefore allow (3) to operate on several RFID Tags at any given instant. Said Reader (3) will search for RFID Tags and compare any tags found to the list of TID data which it has developed internally based on previously received commands. Alternately, in (15), (5) could send data matching TID and data to be encoded to a database, which (3) then accesses independently. Alternately, said data to be encoded could include information like Locking commands to be performed by (3) when the correct TID is encountered.

Alternately, said data to be encoded could be sent to one of a plurality of said Antenna (4) and said Reader (3); in this alternative, each Reader in the plurality of readers would be instructed to look for one particular UID value and encode the corresponding data thereto. This alternative would be useful for RFID protocols that do not support Continuous or Bulk encoding, such as the most common HF protocols. This alternative will be explored further in FIG. 6 and attendant explanation.

It will be seen that blocks 14 and 15 are central to understanding to the current invention. The described activities of said Reader (3) are common in Bulk and Continuous Encoding operations; however, such operations do not allow the serialization of data on said web (1). Because said Antenna (4) operates on many RFID devices in parallel, the sequence of encode operations by (3) may not be the same as that of tags on (1). A very typical scenario is that a weak tag or external interference will cause a delay in operations by (3) and (4), during which more than one RFID Tag enters the field of (4). When (3) resumes normal operation, it finds more than one new tag and has no way to know what order those tags appear on the web. Blocks (14) and (15) of the current invention address that weakness in sequencing and so provide a subtle and elegant but unobvious improvement in the art of Continuous and Bulk Encoding.

In (16), (5) continues to exploit the sequenced data of (6) to improve the Continuous and Bulk Encoding process. As tags exit the RF field established by Antenna (4), Reader (3) has a number of actions to perform. In addition to the encoding activities described above, (3) also reports back to (5) on the progress of its activities. Reader (3) can obviously report its successes. Less obviously, (5) can track status reports from (3) and discern which events should have happened at any given point in time, thereby discerning failures from a device that is not equipped to report failures. A plurality of actions can be triggered by such failures, from further Reports to operator alerts, to slowing or stopping web (1). It is also assumed, though it may vary by implementation, that (5) takes some action to relieve (3) of the burden of failed commands, allowing (3) to better service commands that have not yet failed.

In (16), (5) may further make use of an additional Singulated RFID Reader (2) in order to verify the presence, order, or encoding of RFID Tags on (1).

It can be seen that, through the sequences of (10) through (12) and (14) through (16), said Software Program (5) is able to create a detailed accounting of sequence of TID/UID values and bad RFID Tags on web (1), while also using (3) and (4) to alter the contents of web(1) in a manner that is at once highly flexible and tightly sequenced.

The TID sequencing of blocks (14) and (15), along with the error detection of block (16), bring the benefits of serialization to the art of Continuous and Bulk Encoding. The current invention is therefore a great advancement in that art and in the more general field of RFID Tag Encoding.

FIG. 2

Alternate Embodiment—Many Rows

Figure 2:
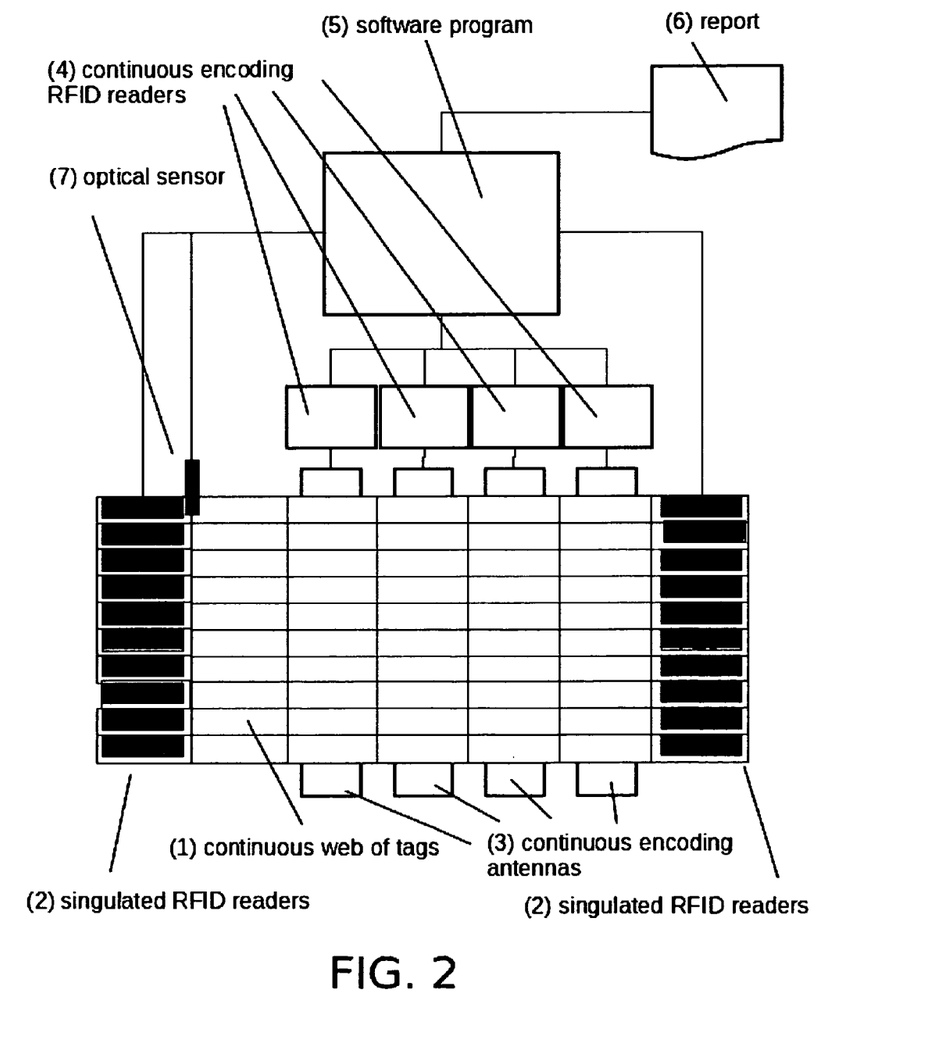
FIG. 2 is an alternate embodiment, with several rows of RFID Tags.

FIG. 2 shows an alternate embodiment in which a continuous web of RFID Tags (1) comprises a plurality of rows of RFID Tags, which can be operated upon independently. Said plurality of rows of RFID Tags is served by a plurality of Singulated RFID Readers (2). Each of said Singulated RFID Readers (2) is positioned to read one and only one RED Tag in the row to which it is assigned. A Software Program (5) records the TID value from each (2) and performs the actions described above in (10) through (14). A second plurality of Singulated RFID Readers (2), at the right of FIG. 2, performs the actions of (16).

FIG. 2 differs from FIG. 1 by comprising a plurality of Continuous Encoding RFID Readers (3) and a plurality of Continuous Encoding RFID Antennas (4). The operations of said Readers (3) may be coordinated in a number of ways. The same commands may be sent to all Readers (3) by (5); commands may be distributed among readers (3) by (5) according to some search algorithm; downstream Readers (3) may be commanded to encode Tags missed by their upstream counterparts; a number of minor variations, obvious to readers skilled in the art, are embodied in the current invention and the claims below. Further, FIG. 2. shows said Antennas (4) arranged across web (1) such that each antenna operates on a single column of web (1). Minor changes in antenna position, made to support search algorithms executed by (5) through (3), will be obvious to readers skilled in the art, and are embodied in the current invention and the claims below.

FIG. 3

Alternate Embodiment—Remote TID/UID Capture

Figure 3:
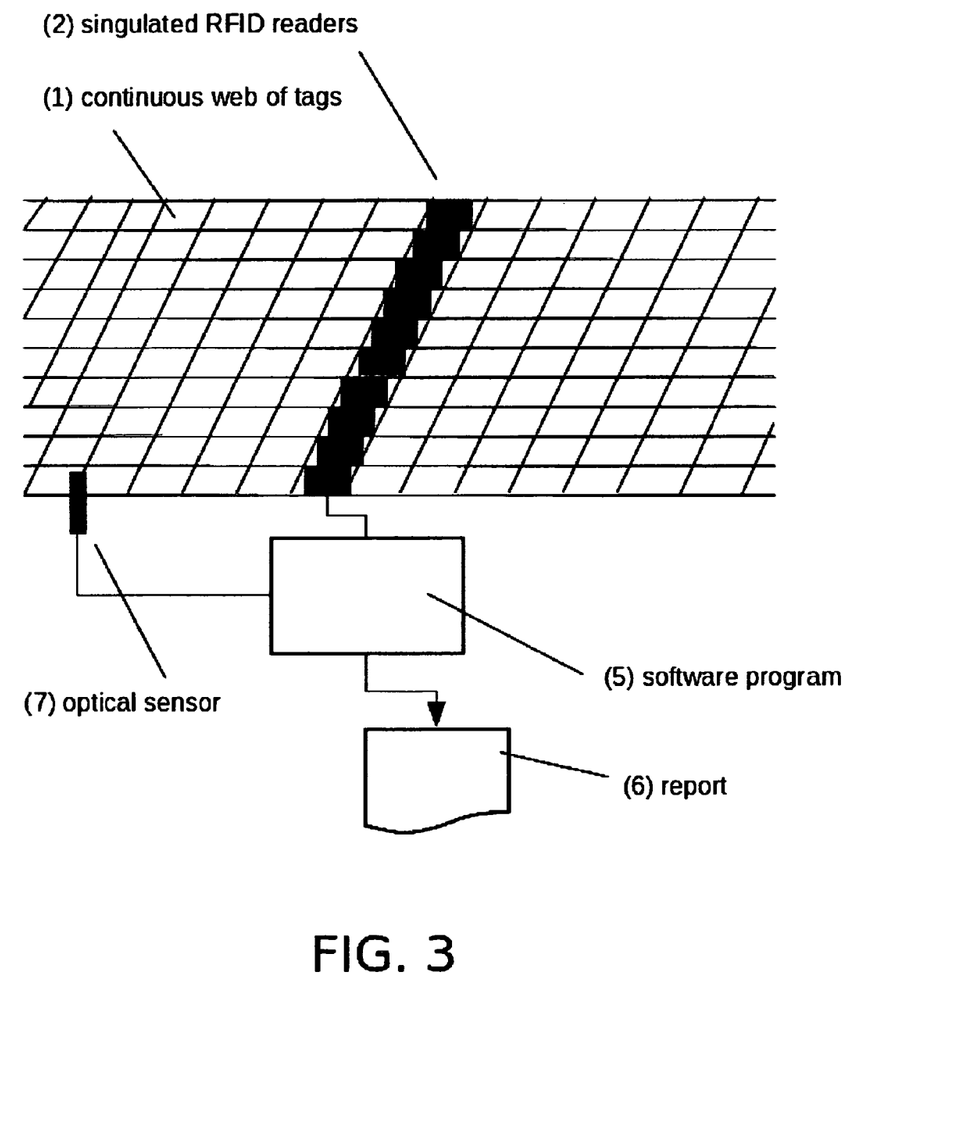
FIG. 3 is an alternate embodiment, in which sequence data is captured in a separate process.

FIG. 3 shows an alternate embodiment in which a Software Program (5) executes blocks (10), (11), and (12), in a process step separate from the other blocks of FIG. 5. In FIG. 3, a continuous web of RFID Tags (1) is processed by some machine, typically a printing press. Working through a plurality of Singulated RFID Readers (2), and triggered by some mechanism like Optical Sensor (7), said (5) records the sequence of TID values and bad spaces on web (1) to a Report (6). In the current embodiment, bad spaces on the web equate to failure events in previously described embodiments.

If the embodiments of FIG. 2 and FIG. 3 were combined, the instance of Software Program (5) in FIG. 3 would create Report (6), which would then be accessed by the instance of Software Program (5) in FIG. 2. The first plurality if Singulated Readers (2) in FIG. 2. would not be needed, since TID, failure and sequence information had already been developed in a separate process.

FIG. 4

Alternate Embodiment—Tagged Items

Figure 4:
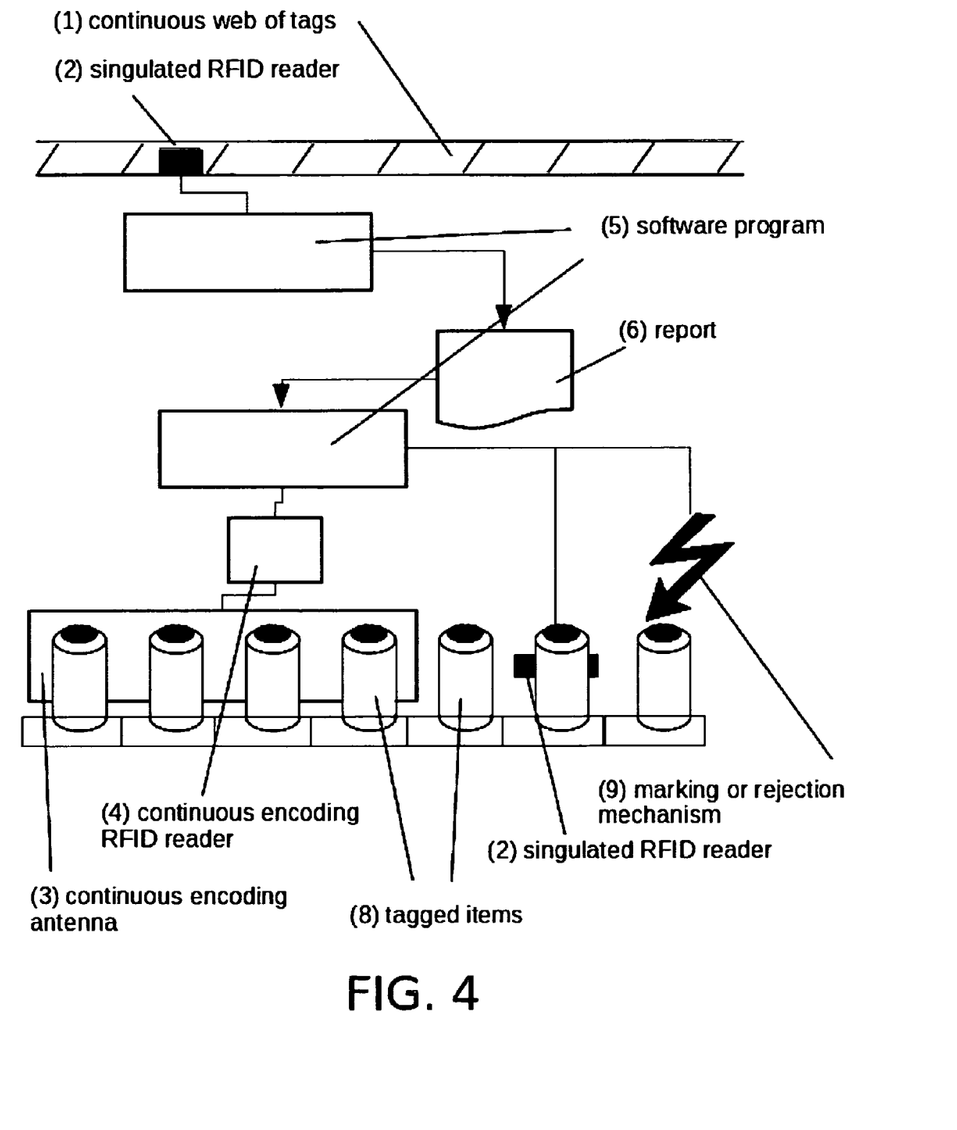
FIG. 4 is an alternate embodiment, in which sequence data is captured in a separate process.

FIG. 4 shows an alternate embodiment in which a Report (6), comprising the sequence of TID values and bad spaces on a Continuous Web of RFID Tags (1), is created as in the embodiment of FIG. 3. Said web (1), in a separate process not shown, is applied to a plurality of Tagged Items (8), in such a manner that the sequence of said Report (6) is preserved in the sequence of said Tagged Items (8). An instance of Software Program (5) reads said Report (6) and uses the sequence therein to program the sequence of encoded data to (8).

The embodiment of FIG. 4 differs from previously described embodiments in comprising a Marking or Rejection Mechanism (9). The physical specifics of said Mechanism (9) are not central to the current invention. The fact that the current invention can Mark or Reject bad items or tags, in proper sequence, despite the central use of Continuous and Bulk Encoding mechanisms which tend to corrupt such sequential operations, is central to the current invention and represents an advancement of the art.

In an alternate embodiment, Report (6) may be generated by an initial Singulated RFID Reader (2), as shown in FIG. 1, eliminating (1) and the uppermost instances of (2) and (5).

In an alternate embodiment, said Mechanism (9) may be replaced with a suitable printer (not shown) and data specific to each tag in the sequence may be printed to each Tagged Item (8). This practice, known as Variable Printing, is common in industry but not reliable in Continuous and Bulk Encoding processes without the current invention to establish sequence.

In an alternate embodiment, said Reader (3) may be allowed to operate in its normal nondeterministic mode, and a Singulated RFID Reader (2), positioned downstream, may be used to establish the order of values on the web. In this embodiment, said Reader (2) becomes the sole input to error detection and reporting as well as physical Mechanism (9). This limited embodiment is regarded as a degenerate case of the current invention because it does not satisfy applications in which the order of data on successive RFID Tags is important; however it is included in the claims of the current invention.

FIG. 6

Alternate Embodiment—High Frequency

Figure 6:
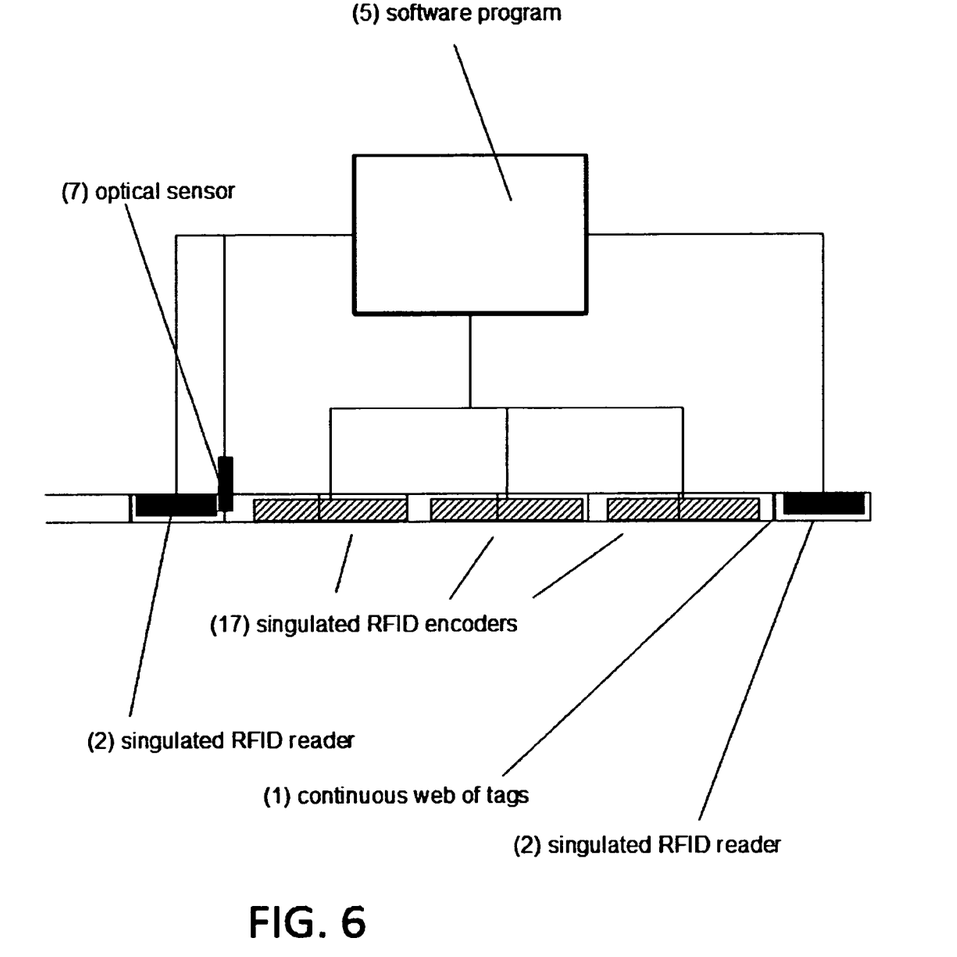
FIG. 6 is an alternate embodiment, implemented with RFID Tags which lack the Bulk and Continuous Encoding facility but support Selected Encoding.

FIG. 6 shows an alternate embodiment in which the benefits of the current Invention are implemented with High Frequency (HF) Tags, which lack built-in support for the Bulk and Continuous Encoding features of UHF EPC1 Gen2 RFID Tags. This embodiment requires tags and encoders that accept a program to scan for a certain Unique Identifier (UID), and encode specific data to the tag bearing that UID. The existing protocols which support said behavior rely on a Select command, in which a tag with a given UID is logically isolated for operations, and other tags coupled to the RFID encoder are excluded from operations.

In FIG. 6, a continuous web of tags (1) enters from the left and proceeds to the right. The operation of RFID components is coordinated by an Optical Sensor (7). Other sensor types may be used within the current Invention; the important thing is that some sensor can detect the transition from one RFID Tag to another. The Invention can also work without a sensor; in that case, all readers and encoders simply search continuously for tags.

As each RFID Tag on said web encounters a Singulated RFID Reader (2), its UID is captured and sent to a Software Program (5). See also items 10 and 11 on FIG. 5, and attendant description above. Said Software Program stores (6) the order of UIDs on (1) and computes the data to be encoded on each tag (14). Referring to FIG. 5 block (15), said Software Program (1) now creates an encoding command and schedules said command among a plurality of Singulated RFID Encoders (17). The selected encoder must be currently idle, and downstream of the extrapolated position of the tag being programmed. Said encoding command must include one UID as read by said first Singulated Reader (2). Said encoding command is sent to said encoder, and said encoder is marked as being in use in (15).

One current example is the Queued Command feature of the commercially available Feig RFID Reader command set, which sets up a compliant RFID reader to wait for a tag with the specified UID and write the given data thereto; however, other equivalent implementations in other command protocols will be considered as part of this Invention as long as the RFID reader accepts only one such instruction for execution when opportunity occurs, but a plurality of such instructions can be executed in parallel on a plurality of such RFID readers separated in space.

Each unit of said plurality of encoders (17) executes the standard RFID practices of Inventory, Selection by UID when Inventory succeeds, and Encoding when Selection succeeds, in response to its particular command. It will be seen that said plurality of standard RFID encoders (17) can readily be used as a single coordinated subsystem for Serialized Continuous RFID Encoding, by using them in the manner described in this Invention.

This Description assumes that each encoder in said plurality (17) is capable of waiting for one and only one UID to appear within a given timeframe, and of encoding data to said UID when it does appear. This Description further assumes that each encoding antenna operates independently by virtue of a combination of antenna design and shielding, which are not part of the current invention.

FIG. 6 shows the said encoding antennas (17) elongated with respect to the said reading antennas (2). Said elongation allows the Invention to compensate for the long time required to encode RFID data. Elongation of said encoding antenna allows each selected tag to couple to said encoding antenna for a longer time at a given web speed. High speeds can be attained with longer antennas. It should be noted that said elongation would greatly slow the attainable speed without the remainder of the current Invention, due to constraints discussed above in the background section.

If necessary, a serpentine path may be established to allow each said tag in (1) to couple to one said antenna in (17) within a restricted linear dimension, with proper attention to antenna and shielding design. That is regarded as an obvious extension of the current invention.

The process of FIG. 6 is completed by said Software Program (5) executing Singulated Verification (16) through an additional Singulated RFID Reader (2) on each tag as it exits the Apparatus. In a further alternate embodiment, said Singulated Verification may be omitted or performed elsewhere, without diminishing the unique nature of the current Invention.

I claim:

1. A method of encoding data onto a plurality of RFID tags in motion, at economically high speeds, in which a sequence of encoded information can be determined, programming a series of independent commands, and monitoring a progress of the programming of the series of independent commands, comprising:

providing an initial singulated to a near field RFID Reader to capture a plurality of unique Tag IDs (TIDs) of the plurality of RFID Tags entering a physical area under control of the near field RFID Reader;

providing the plurality of unique Tag IDs to at least one RFID Encoder capable of Continuous Encoding or Bulk Encoding;

using sequential TID data from the near field RFID Reader to look up or compute the series of independent commands should be encoded on each of the plurality of RFID Tag in the vicinity of the near field RFID Reader;

programming the computed series of independent commands corresponding to the sequential TID data;

transmitting each of the computed series of independent commands to the at least one Encoder for encoding;

monitoring the progress of the programming of the series of independent commands by monitoring the progress of each of the at least one Encoder;

reading encoded data from each of the plurality of RFID Tags as the plurality of RFID Tags physically leaves the vicinity of the near field RFID Reader;

providing a final singulated to the near field RFID Reader to screen each of the plurality of RFID Tags for completion of the programming of the series of independent commands;

wherein a use of the sequential TID data to sequence the execution of Encoding, monitoring the progress of Encoding, enhance the ability to sequentially encode the computed series of independent commands, detect failure of the progress of the programming of the series of independent commands, and detect failure of reading encoded data from each of the plurality of RFID Tags as the plurality of RFID Tags physically leaves the vicinity of the near field RFID Reader;

wherein the method steps are performed at different times or location, and a processing data necessary for completion of the programming of the series of independent commands is transmitted via computerized Reporting.

2. A method of encoding data onto a plurality of RFID tags in motion, at economically high speeds, in which a sequence of encoded information can be determined, programming a series of independent commands, and monitoring a progress of the programming of the series of independent commands, comprising:

provide an initial singulated to a near field RFID Reader to capture a plurality of unique Tag IDs (TIDs) of the plurality of RFID Tags entering a physical area under control of the near field RFID Reader;

providing the plurality of unique Tag IDs to at least one RFID Encoder capable of Continuous Encoding or Bulk Encoding;

using sequential TID data from the near field RFID Reader to look up or compute the series of independent commands should be encoded on each of the plurality of RFID Tag in the vicinity of the near field RFID Reader;

programming the computed series of independent commands corresponding to the sequential TID data;

transmitting each of the computed series of independent commands to the at least one Encoder for encoding;

monitoring the progress of the programming of the series of independent commands by monitoring the progress of each of the at least one Encoder;

reading encoded data from each of the plurality of RFID Tags as the plurality of RFID Tags physically leaves the vicinity of the near field RFID Reader;

providing a final singulated to the near field RFID Reader to screen each of the plurality of RFID Tags for completion of the programming of the series of independent commands;

wherein a use of the sequential TID data to sequence the execution of Encoding, monitoring the progress of Encoding, enhance the ability to sequentially encode the computed series of independent commands when the plurality of the RFID tags are in motion;

wherein the method steps are performed at different times or location, and a processing data necessary for completion of the programming of the series of independent commands is transmitted via computerized Reporting.

\* \* \* \* \*